United States Patent Office 3,338,049
Patented Aug. 29, 1967

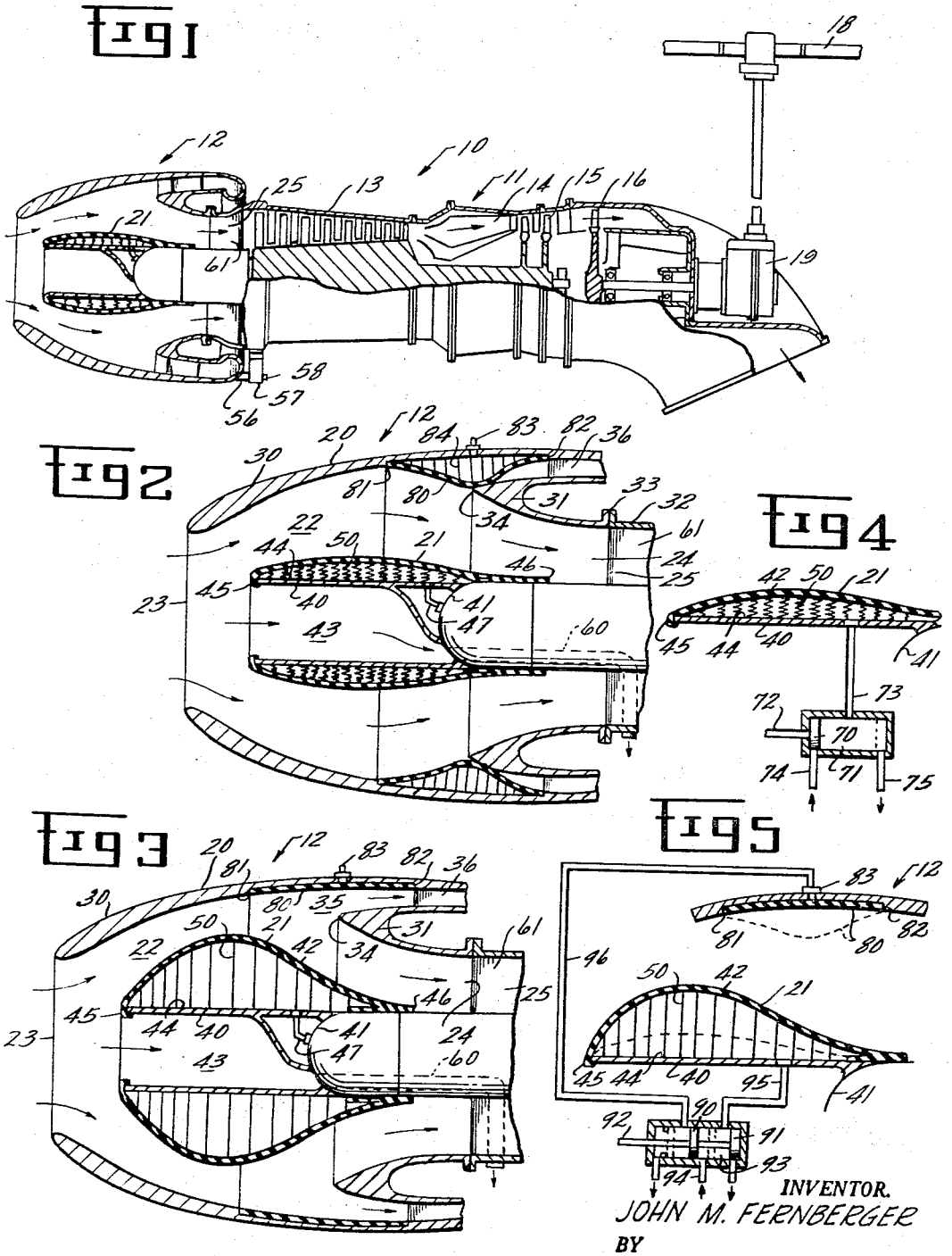

3,338,049
GAS TURBINE ENGINE INCLUDING SEPARATOR FOR REMOVING EXTRANEOUS MATTER
John Marshall Fernberger, Marblehead, Mass., assignor to General Electric Company, a corporation of New York
Filed Feb. 1, 1966, Ser. No. 524,101
11 Claims. (Cl. 60—39.09)

ABSTRACT OF THE DISCLOSURE

This disclosure describes a separator apparatus for removing extraneous matter from the airstream entering a gas turbine engine. An expansible wall means is positioned in the engine upstream of the compressor inlet to deflect extraneous materials entrained in the airstream from the compressor inlet. A collecting means is cooperatively arranged with respect to the expansible wall means to receive the deflected extraneous material. The disclosure discusses the various aspects and features of the invention in detail with the aid of FIGS. 1–5 of the drawing here attached. In addition a detailed description of the relation of the separator to other engine parts is given, as well as a complete description of how the separator operates.

---

This invention relates to gas turbine engines having separators for removing extraneous matter from the air stream supplied to the engine and, more particularly, to separators for efficiently collecting and removing foreign matter such as sand, dust, and water from the air stream. The invention is especially suited for use in aircraft installations in which protection against foreign object damage (FOD) is required under only certain operating conditions.

Aircraft gas turbine engines are particularly susceptible to damage from foreign objects introduced into the air inlets of the engines. This problem has been most acute in the past with respect to relatively large foreign objects such as stones, gravel, birds, hail, and the like which can cause instant and massive damage when introduced into the engine. With the advent of gas turbine powered helicopters and other vertical take-off and landing (VTOL) aircraft, smaller particles of foreign matter such as sand, dust, and water have become increasingly troublesome due primarily to the conditions under which such aircraft are commonly operated. Because of its VTOL capability, this type of aircraft may be utilized in areas where conventional airfields are nonexistent, such as in combat zones and in other isolated areas. Helicopters and other VTOL aircraft are also especially suited for low altitude operation on both land and sea and have particular utility for certain low altitude missions including close combat support, search-and-rescue, and antisubmarine warfare. Under these and related conditions, substantial quantities of small foreign objects such as sand and dust particles and drops of water may become entrained in the air stream supplied to the gas turbine engine. These particles, which individually have little effect on the engine, can cause very substantial damage when introduced into the engine in large quantities. For example, it has been found that the engine of a helicopter operating at low altitude in a desert environment can lose performance rapidly due to erosion of engine blading by high velocity sand particles. In addition to erosion, extraneous matter, particularly salt water which may be introduced into the engine when operating over the ocean, can cause rapid and destructive corrosion.

It is therefore desirable to provide means in the engine for separating out the particles of sand, dust, water and the like before the air stream is supplied to the compressor. To be satisfactory, it is essential that the separator means chosen to provide this function be effective in removing the unwanted particles from the air stream. High efficiency is particularly desirable in an aircraft separator in view of the large quantities of air consumed by a gas turbine engine. However, high separating efficiency alone is not the only characteristic required of a separator used in an aircraft gas turbine engine. Since the separator is an intimate part of the complete aircraft powerplant, it should not affect adversely the overall powerplant efficiency; in other words, the pressure losses in the air stream flowing through the separator should be as small as possible, particularly when the aircraft is operating under extended cruise conditions. In addition, the separator should be compact and lightweight since aircraft generally, and VTOL aircraft in particular, have stringent weight limitations. Furthermore, since the separator will be in contact with the extraneous matter, it should be relatively insusceptible to erosion and corrosion. Finally, it should have the above characteristics without being excessively complicated and expensive, both to manufacture and to maintain.

It is a primary object of this invention to provide an engine separator which is highly effective in removing extraneous matter from the air stream without causing excessive pressure losses in the stream.

Another object is to provide a lightweight and compact separator for effectively removing extraneous matter from the air stream supplied to an aircraft gas turbine engine.

A further object is to provide for a gas turbine engine a separator which is efficient in removing particles of sand, dust, water, and the like from the entering air stream under certain operating conditions without causing excessive pressure losses in the air stream under other normal operating conditions.

A further object is to provide a separator which is not itself susceptible to erosion and corrosion for separating small particles of foreign matter from an air stream supplied to an aircraft gas turbine engine.

A still further object is to provide a separator capable of attaining the above objects without being excessively complicated and expensive.

Briefly stated, in carrying out the invention in one form, there is provided an improved gas turbine engine having a separator for removing extraneous matter from the stream of air supplied to the compressor. The separator includes expansible wall means located upstream of the compressor inlet, the expansible wall means having expanded and unexpanded positions. The expansible wall means in its unexpanded position permits substantially unimpeded flow of air to the compressor inlet and in its expanded position deflects extraneous matter entrained in the air from the compressor inlet. By one aspect of the invention, the expansible wall means is comprised in part by an inflatable elastic diaphragm which, when inflated to its expanded position, imparts a substantial radial component of velocity to an air stream flowing in a generally axial direction through an annular passageway to the compressor. Collection means including an annular slot opening into the annular passageway is located intermediate the portion of the diaphragm which deflects the air stream and the compressor inlet. The configuration of the inflated elastic diaphragm and the relative positions of the diaphragm, the collection means, and the compressor inlet are such that extraneous matter is deflected into the collection means by the inflated diaphragm while the air stream flows on to the compressor inlet.

By a further aspect of the invention, the elastic diaphragm peripherally surrounds a generally cylindrical outer surface of an axial support member, the diaphragm having axially spaced upstream and downstream ends circumferentially secured to the support member. In its deflated position, the entire diaphragm is substantially contiguous with the outer surface of the support member so as to not interfere with flow of air to the compressor. Accordingly, when the aircraft is operating under conditions in which deflection is not needed, the diaphragm may be deflated so as to not introduce significant pressure losses into the air stream. In its inflated position, however, the portion of the diaphragm intermediate its ends projects into the annular passageway to deflect the air stream and entrained matter. By a still further aspect of the invention, means are provided for inflating and deflating the elastic diaphragm in unison with similar diaphragm means utilized as a value for controlling flow through the annular collection slot.

While the invention is distinctly claimed and particularly pointed out in the claims appended hereto, the invention, both as to organization and content, will be better understood and appreciated, alng with other objects and features thereof, from the following detailed description when taken in conjunction with the drawing, in which:

FIG. 1 is a view partially in cross section of a gas turbine engine having a separator formed in accordance with the present invention associated therewith;

FIG. 2 is an enlarged cross sectional view of the separator of FIG. 1, the elastic diaphragm of the separator being shown in its deflated position;

FIG. 3 is a view similar to FIG. 2 showing the elastic diaphragm in its inflated position;

FIG. 4 is a schematic view of a suitable control valve arrangement for inflating and deflating the elastic diaphragm; and FIG. 5 is a schematic view of a control valve arrangement for inflating and deflating both the elastic diaphragm and similar means utilized for controlling flow to the annular collection slot.

With reference to FIG. 1, a gas turbine engine assembly 10 is illustrated, the assembly 10 including a gas turbine engine 11 of the turbo-shaft type and a separator 12 formed in accordance with the present invention. The engine 11 includes in axially spaced serial flow arrangement a compressor 13, an annular combustor 14, a gas generator turbine 15 for driving the compressor 13, and a power turbine 16 driving an output shaft 17. The turboshaft engine 11 illustrated is particularly suited for helicopter applications in which a helicopter rotor 18 is driven by the output shaft 17 through suitable speed reduction means such as a gearbox 19. As this description proceeds, however, it will become obvious to those skilled in the art that the separator may be used in conjunction with turbojet and turboprop engines as well as turboshaft engines since the separator is essentially suited for all forms of turbine engines.

As best illustrated by FIGS. 2 and 3, the separator 12 is an essentially static component having no rotating parts. More particularly, the separator 12 includes outer wall means 20 and inner wall means 21 forming therebetween an annular passageway 22 extending axially between an upstream inlet 23 and a downstream outlet 24. As shown by FIG. 1, the annular outlet 24 is in fluid flow communication with the inlet 25 of the compressor 13 each that the entire flow of air supplied to the gas turbine engine 11 first passes through the passageway 22 as indicated by the arrows of FIG. 1.

Returning attention now to FIGS. 2 and 3, the outer wall means 20 comprises a housing having a first upstream annular portion 30 and a second downstream annular portion 31 which is secured to the front frame 32 of the compressor 13 by suitable fastening means at mounting flanges 33. The upstream end 34 of the second housing portion 31 is spaced radially inward of the first portion 30 such that the two portions 30 and 31 form an annular slot 35 therebetween through which extraneous matter may be extracted from the air stream, the two portions 30 and 31 being held in proper alignment by means of radial struts 36 extending between the portions immediately downstream of the extraction slot 35. The inner wall means is expansible and, as such, is comprised of an inner support member 40 which slips over and is secured to the inlet fairing 41 of the gas turbine engine 11 and an elastic diaphragm 42. More particularly, the inner support member 40 is a hollow, generally cylindrical member which projects axially forward of the inlet fairing 41 almost to the inlet 23 of the separator 12, the support member 40 forming a cavity 43 therein opening in the upstream direction. The function of this cavity 43 will be described presently. The support member 40 has a cylindrical outer surface 44 upon which the elastic diaphragm 42 is mounted, the elastic diaphragm 42 peripherally surrounding the outer surface 44 and being circumferentially secured and hermetically sealed thereto at axially spaced upstream and downstream ends 45 and 46, respectively. Means indicated generally by the numeral 47 are provided for inflating and deflating the elastic diaphragm 42, the inflated or expanded position being illustrated by FIG. 3 and the deflated or unexpanded position being illustrated by FIG. 2.

When the elastic diaphragm 42 is in its deflated position as illustrated by FIG. 2, it is substantially contiguous with the outer surface 44 of the inner support member 40 throughout its entire axial length. Since the diaphragm 42 does not project radially into the annular passageway 22 to any significant extent, axial flow of air through the passageway 22 between the inlet 23 and the outlet 24 is substantially unimpeded. Consequently, the separator 12 of this invention does not introduce significant inlet pressure losses when operating with the diaphragm 42 in its deflated position. Furthermore, since the wall means 20 and 21 are neither highly stressed rotating members nor basic structural support members for the gas turbine engine assembly 10, the separator 12 may be fabricated of relatively lightweight, low strength, and inexpensive materials. Accordingly, it will be readily appreciated that the separator of this invention is particularly suited for use with gas turbine engines which are operated for extended periods under conditions where separation of entrained particles is not necessary, but where efficient powerplant performance is required. Such conditions usually exist, for example, during cruise operation at relatively high altitudes.

On the other hand, the separator 12 of this invention is highly efficient in separating extraneous matter from the air stream when the elastic diaphragm 42 is in the inflated position illustrated by FIG. 3. When inflated, the diaphragm 42 is contiguous with the outer surface 44 of the support member 40 only at its ends 45 and 46, the portions of the diaphragm 42 intermediate the ends being spaced radially from the surface 44. The actual inflated configuration of the diaphragm 42 is controlled by inelastic restraining cords 50 secured at their opposite ends to the diaphragm 42 and the support member 40, the cords 50 being placed in radial tension when high pressure fluid is introduced by the inflating means 47. It will, of course, be obvious to those skilled in the art that other arrangements could be used for controlling the inflated shape of the diaphragm 42, such as, for example, circumferential restraining cords embedded in the diaphragm. However controlled, the maximum radial spacing between the diaphragm 42 and the surface 44 is substantially midway between the ends 45 and 46 of the diaphragm, and the radial spacing at that point is such that the diameter of the inflated diaphragm is greater than the diameter of the inlet 23. Consequently, extraneous matter flowing through the inlet 23 cannot flow axially through the passageway 22 to the compressor inlet 25 without striking the portion of the diaphragm 42 upstream of the region of maximum radial spacing, the diaphragm deflecting the air and the entrained matter radially outwardly and thereby imparting a substantial radial component of velocity to both the air and the extraneous matter.

When deflected by the diaphragm 42 in the manner just described, the small particles of extraneous matter flow through the annular slot 35, which is located axially between the region of maximum radial spacing and the outlet 24, to an annular collection chamber 55 which surrounds the upstream end of the compressor 13. A discharge pipe 56 connects the collection chamber 55 to an engine driven pump 57 which draws the particles to atmosphere through a pipe 58. With the exception of the relatively small quantity of air extracted along with the foreign matter (controlled primarily by the capacity of the pump 57), the air stream, which has relatively low mass, flows on through the annular passageway 22 to the compressor inlet 25. The particles of matter entrained in the stream, however, have relatively high mass and are thus caught by the collection chamber since they are unable to turn inwardly with the air stream at a rate sufficient to miss the annular slot 35. It will thus be seen that the separator 12 of this invention is highly efficient in removing extraneous matter from an air stream flowing through the passageway 22.

The particles of extraneous matter which do not enter the passageway 22 flow into the cavity 43 formed by the inner support member 40 where the particles are either allowed to collect or are removed through an extraction tube 60 which extends through the inlet fairing 41 and radially outward through the inlet guide vanes 61 of the engine 11. While not shown, it will be obvious to those skilled in the art that the tube 60 may be connected to a pump similar to pump 57 such that the collected matter may be removed more readily. As just described, the extraction tube 60 and the inflation means 47 are connected to the front frame 32 of the compressor 12 and therefore require some modifications in the front frame 32. If desired, however, the inflation means 47 and the extraction means for the cavity 43 may be provided independently of the front frame 32 such that no modifications need be made in the basic engine 11.

With reference now to FIG. 4, a suitable control valve arrangement for the inflation means 47 will be described. As illustrated, a piston 70 is reciprocally mounted in a substantially closed cavity 71 for movement between a first position illustrated by solid lines and a second position illustrated by broken lines, the piston 70 being moved by means of a control rod 72 operated in a suitable manner by the pilot. To supply pressurized fluid to the space between the elastic diaphragm 42 and the outer surface 44 of the support member 40, the space is connected to an intermediate portion of the cavity 71 by a conduit 73, similar conduits 74 and 75 at opposite ends of the cavity 71 being connected to a source of pressurized fluid and to a drain, respectively. To position the diaphragm 42 in its deflated position, the piston 70 is positioned in its first position such that it blocks the conduit 74 and vents the space between the diaphragm 42 and the support member 40 to the drain through conduits 73 and 75. To inflate the diaphragm 42, the piston 70 is moved to its second position in which conduit 75 to the drain is blocked by the piston and high pressure fluid is supplied to the diaphragm through conduits 74 and 73. It will, of course, be obvious that the conduit 73 of this schematic arrangement corresponds to the exposed conduit of FIGS. 1–3 to which the numeral 47 has been attached.

When deflated, the diaphragm 42 does not inhibit flow of air through the passageway 22 to any substantial degree. To provide even more efficient operation when separation is not required, the annular slot 35 may be closed by means of an annular elastic diaphragm 80 mounted on the inner surface of the first housing portion 30, the upstream end 81 of the diaphragm 80 being hermetically sealed to the housing axially upstream of the slot 35 and the downstream end 82 being hermetically sealed to the housing axially downstream of the slot 35. The elastic diaphragm 80, which is inflated and deflated by inflation means 83, has restraining cords 84 associated therewith for controlling the inflated configuration of the diaphragm 80. The cords 84 are sized such that the inflated diaphragm 80 not only contacts the upstream end 34 of the second housing portion 31 to thereby close the slot 35, but also forms with the housing portions 30 and 31 a smooth and continuous aerodynamic surface extending the entire distance between the inlet 23 and the outlet 24. Pressure losses are thus held to a practical minimum when separation is not desired. When, however, separation is desired, diaphragm 80 is deflated to permit separation in the manner described above.

While the inflation means 83, as the inflation means 47, may take different forms in practice, it will occur to those skilled in the art that a control valve arrangement similar to that illustrated by FIG. 4 may be utilized for inflating and deflating the diaphragm 80. Such an arrangement could be operated independently of the inflation means 47. Since, however, the diaphragm 80 is inflated when the diaphragm 42 is deflated and vice versa, the inflation means 47 and 83 may be combined into a single control valve arrangement having the form illustrated by FIG. 5. More particularly, a pair of pistons 90 and 91 are secured to a control rod 92 and are reciprocally mounted in a substantially closed cavity 93 for movement between first positions illustrated by solid lines and second positions illustrated by broken lines. When the pistons 90 and 91 are positioned in the first positions, the diaphragm 42 is inflated by pressurized fluid supplied through conduits 94 and 95 and diaphragm 80 is deflated through conduits 96 and 97 leading to a drain. In a similar manner, the diaphragm 80 is inflated by pressurized fluid supplied through conduits 94 and 96 when the pistons 90 and 91 are in the second positions, and the diaphragm 42 is deflated since conduits 95 and 97 lead to the drain.

The expansible diaphragms 42 and 80 can be formed from any rubber-like material, provided that the material is sufficiently elastic to permit expansion thereof under the application of a high pressure fluid and to permit rapid resumption of its unstretched condition upon the elimination of the pressure. Such elastic materials can be used since the diaphragms are only exposed to the relatively cold air in the annular passageway 22 and not to hot combustion products. The rubber-like material from which the diaphragms 42 and 80 are constructed is relatively insusceptible to erosion damage from the small particles of extraneous matter because of its resiliency.

From the foregoing it will be seen that the improved axial flow separator of this invention is highly efficient in removing small particles of extraneous matter from a fluid stream without causing excessive pressure losses in the fluid stream, particularly under operating conditions in which separation is not required. In addition to being highly effective, the separator of this invention is lightweight and compact and is therefore particularly suited for aircraft applications. Also, since it has no rotating parts and operates at ambient temperature only, the separator is relatively uncomplicated and may be fabricated from materials not having high temperature operational capabilities. As a result, the separator is a relatively inexpensive component, both to manufacture and to maintain. Furthermore, the separator of this invention may be easily anti-iced if desired by embedding suitable electrical heating elements within the diaphragms. In addition, the separator of this invention is fail safe in that a loss of pressure to the diaphragm 42 will cause it to deflate and thus permit greater flow of air to the engine 11.

While a preferred embodiment of the invention has been illustrated and described above, it will be understood that various changes and modifications may be made without departing from the spirit and scope of the invention, and it is intended to cover all such changes and modifications by the appended claims.

What is claimed as new and is desired to secure by Letters Patent of the United States is:

1. In a gas turbine engine assembly including a compressor having an inlet thereto, a combustor, and a turbine in serial flow arrangement, a separator for removing extraneous matter from a stream of air supplied to the compressor, said separator comprising:

expansible wall means located upstream of said compressor inlet and forming a boundary surface for the flow of air to said compressor inlet.

said expansible wall means having an unexpanded position and an expanded position, said wall means in said unexpanded position permitting substantially unimpeded flow of air to said compressor inlet and said wall means in said expanded position forming a tortuous path for the flow of air to said compressor inlet, means for expanding said expansible wall means to said expanded position and for deflating said expansible wall means to said unexpanded position, and means for receiving extraneous matter positioned axially between said expansible wall means and said compressor inlet, the expanded configuration of said expansible wall means and its location relative to said compressor inlet being such that extraneous matter entrained in air flowing along said expansible wall means in said expanded position is deflected from said compressor inlet, into said extraneous matter receiving means.

2. An assembly as defined by claim 1 in which said expansible wall means comprises elastic diaphragm means.

3. In a gas turbine engine assembly including a compressor having an inlet thereto, a combustor, and a turbine in serial flow arrangement, a separator for removing extraneous matter from a stream of air supplied to the compressor, said compressor comprising:

inner and outer wall means defining an axially extending annular passageway having at opposite ends thereof an inlet and an outlet communicating with said compressor inlet, one of said inner and outer wall means including primary elastic diaphragm means having a deflated position and an inflated position, said elastic diaphragm means in said deflated position permitting substantially unimpeded axial flow of air through said annular passageway to said compressor inlet and a portion of said elastic diaphragm means in said inflated position imparting a substantial radial component of velocity to air flowing through said annular passageway to said compressor inlet, means for inflating and deflating said elastic diaphragm means, and collection means located axially between the position of said elastic diaphragm means which imparts radial velocity to air flowing through said passageway and said outlet from said passageway, said collection means being positioned radially to receive extraneous matter entrained in air flowing through said passageway when said elastic diaphragm means is in said inflated position.

4. An assembly as defined by claim 4 in which said inner wall means includes an inner support member having a generally cylindrical outer surface, said primary elastic diaphragm means peripherally surrounding said inner support member and having axially spaced upstream and downstream ends circumferentially secured to said inner support member, said entire elastic diaphragm means in said deflated position being contiguous with the outer surface of said inner support member, and said elastic diaphragm means intermediate said ends thereof in said inflated position being spaced radially from the outer surface of said inner support member, the maximum radial spacing between said elastic diaphragm means and said inner support member being substantially midway between said ends of said elastic diaphragm means.

5. An assembly as defined by claim 4 in which said inner support member forms a supplementary collection chamber inwardly of said cylindrical outer surface, said supplementary collection chamber having a radially disposed inlet at the upstream end of said inner support member for receiving extraneous matter in air flowing through the inlet of said annular passageway.

6. An assembly as defined by claim 4 including restraining members associated with said primary elastic diaphragm means for controlling the inflated shape of said elastic diaphragm means.

7. An assembly as defined by claim 6 in which said collection means includes an annular slot formed by said outer wall means, said annular slot providing fluid flow communication between said annular passageway and said collection means, said annular slot being located axially downstream of the region of maximum radial spacing between said elastic diaphragm means and said inner support member.

8. An assembly as defined by claim 7 including valve means associated with said annular slot to control flow of air and extraneous matter through said annular slot to said collection means, said valve means being movable between an open position permitting flow through said annular slot and a closed position preventing flow through said annular slot.

9. An assembly as defined by claim 8 in which said valve means associated with said annular slot comprises secondary elastic diaphragm means, said separator further including means for inflating said secondary elastic diaphragm means to said closed position and for deflating said secondary elastic diaphragm means to said open position.

10. An assembly as defined by claim 9 including common means for inflating and deflating said primary and secondary elastic diaphragm means and deflating said secondary elastic diaphragm means so as to remove extraneous matter from air flowing through said separator, and simultaneously deflating said primary elastic diaphragm means and inflating said secondary elastic diaphragm means to permit unimpeded flow of air to said compressor inlet.

11. An assembly as defined by claim 10 in which said inner support member forms a supplementary collection chamber inwardly of said cylindrical outer surface, said supplementary collection chamber having a radially disposed inlet at the upstream end of said inner support member for receiving extraneous matter in air flowing through the inlet of said annular passageway.

References Cited
UNITED STATES PATENTS

| | | | |
|---|---|---|---|
| 2,636,666 | 4/1953 | Lombard | 55—306 X |
| 2,755,044 | 7/1956 | Gurney. | |
| 2,763,426 | 9/1956 | Erwin. | |
| 2,838,227 | 6/1958 | Thomas et al. | 230—114 |
| 2,944,731 | 7/1960 | Kastan | 60—39.09 X |
| 2,966,028 | 12/1960 | Johnson et al. | 137—15.1 |
| 3,148,043 | 9/1964 | Richardson et al. | 60—39.09 X |

CARLTON R. CROYLE, *Primary Examiner.*